(12) United States Patent
Monchalin et al.

(10) Patent No.: US 10,794,834 B2
(45) Date of Patent: Oct. 6, 2020

(54) REAL-TIME INSPECTION OF AUTOMATED RIBBON PLACEMENT

(71) Applicant: National Research Council of Canada, Ottawa (CA)

(72) Inventors: Jean-Pierre Monchalin, Montreal (CA); Ali Yousefpour, Verdun (CA); Guy Lamouche, Montreal (CA); Bruno Gauthier, Saint-Sulpice (CA); Steven Roy, Montreal (CA); Christian Padioleau, Montreal (CA)

(73) Assignee: National Research Council of Canada, Ottawa, Ontario (CA)

( * ) Notice: Subject to any disclaimer, the term of this patent is extended or adjusted under 35 U.S.C. 154(b) by 305 days.

(21) Appl. No.: 15/547,125

(22) PCT Filed: Jun. 8, 2016

(86) PCT No.: PCT/IB2016/053368
§ 371 (c)(1),
(2) Date: Jul. 28, 2017

(87) PCT Pub. No.: WO2016/199038
PCT Pub. Date: Dec. 15, 2016

(65) Prior Publication Data
US 2018/0017499 A1 Jan. 18, 2018

Related U.S. Application Data

(60) Provisional application No. 62/172,559, filed on Jun. 8, 2015.

(51) Int. Cl.
*B32B 41/00* (2006.01)
*G01N 21/84* (2006.01)
(Continued)

(52) U.S. Cl.
CPC ......... *G01N 21/8422* (2013.01); *B29C 70/38* (2013.01); *B29C 70/54* (2013.01);
(Continued)

(58) Field of Classification Search
CPC ....... G01N 21/8422; G01N 2021/8472; G01B 9/02091; G01B 11/303; B29C 70/54; B29C 70/38; B29K 2307/04
(Continued)

(56) References Cited

U.S. PATENT DOCUMENTS 4,752,140 A 6/1988 Cielo et al.
5,963,660 A 10/1999 Koontz et al.
(Continued)

FOREIGN PATENT DOCUMENTS

| EP | 2077447 A1 | 7/2009 |
|---|---|---|
| EP | 2639048 A1 | 9/2013 |
| WO | 2013139709 A1 | 9/2013 |

OTHER PUBLICATIONS

Krombholz, Christian, et al. "Advanced Automated Fibre Placement." 2013. 6 pages.
(Continued)

*Primary Examiner* — Michael N Orlando
*Assistant Examiner* — Joshel Rivera
(74) *Attorney, Agent, or Firm* — Jason E. J. Davis

(57) ABSTRACT

A technique for automated online inspection of manufacture of a fibre reinforced polymer composite part during automated ribbon placement (e.g. ATL or AFP) uses interferometric inspection (e.g. OCT) to detect deviations from a planned lay-up for the part, to identify defects. On line, real-time inspection (i.e. on-the-fly) is demonstrated, and edge type defects and whole surface defects are identifiable. A sensor is demonstrated that does not extend a working envelope of the robotic head used for rib bon placement.

20 Claims, 7 Drawing Sheets

(51) Int. Cl.
  *B29C 70/38* (2006.01)
  *B29C 70/54* (2006.01)
  *G01B 9/02* (2006.01)
  *B29K 307/04* (2006.01)
  *G01B 11/30* (2006.01)

(52) U.S. Cl.
  CPC ...... *G01B 9/02091* (2013.01); *B29K 2307/04* (2013.01); *G01B 11/303* (2013.01); *G01N 2021/8472* (2013.01)

(58) Field of Classification Search
  USPC .......................... 156/64, 350, 351, 378, 379
  See application file for complete search history.

(56) References Cited

U.S. PATENT DOCUMENTS

| | | |
|---|---|---|
| 6,871,684 B2 | 3/2005 | Engelbart et al. |
| 7,835,567 B2 | 11/2010 | Oldani |
| 2007/0097359 A1 | 5/2007 | Engelbart et al. |
| 2007/0229805 A1 | 10/2007 | Engelbart et al. |
| 2012/0216957 A1* | 8/2012 | Engelbart ............. B29C 70/384 156/379 |
| 2014/0124120 A1 | 5/2014 | Pham et al. |
| 2015/0254835 A1 | 9/2015 | Dorris et al. |

OTHER PUBLICATIONS

Search Report and Written Opinion of International Application No. PCT/IB2016/053368 filed Jun. 8, 2016.
2010 SPIE Conference proceedings, Aachen University.
Public release by NCDMM / Ingersoll Machine Tools, May 16, 2013.
Public release on Feb. 27, 2014 by Camozzi Machine Tools.
Public release on Mar. 8, 2013 by Camozzi Machine Tools.
Proposal for on tool inspection of automated composite material placement, Jan. 18, 2012, Ingersoll Machine Tools.
Supplementary European Search Report issued in respect of corresponding European Application No. 16806986.2.
Samuel Lawman and Haida Liang, High precision dynamic multi-interface profilometry with optical coherence tomography, Applied Optics vol. 50, Issue 32, pp. 6039-6048 (2011).

* cited by examiner

REAL-TIME INSPECTION OF AUTOMATED RIBBON PLACEMENT

CROSS-REFERENCE TO RELATED APPLICATIONS

This application is a national phase entry of International Patent Application PCT/IB2016/053368 filed Jun. 8, 2016, which claims the benefit of U.S. Provisional Patent Application Ser. No. 62/172,559 filed Jun. 8, 2015.

FIELD OF THE INVENTION

The present invention relates in general to the automated inspection of automated ribbon placement, and in particular to on-line, real-time automated monitoring of deposition of ribbons of fibres (including prepreg tows, and slit or whole tapes), by a robotic ribbon placement machine, such as an automated tape layup or automated fibre placement machine.

BACKGROUND OF THE INVENTION

Polymer matrix composites (or Fibre Reinforced Polymers FRP) are commercially important materials because of their stiffness, strength, and lightness, because of a suite of design and manufacturing techniques that allow for engineering of optimal weight for a desired strength and stiffness at each point on a part, even if the part has a complex geometry, or a very large size. Parts having complex shapes and large structural parts, such as a fuselage or wing of an aircraft, rotors of helicopters, and airfoils for wind turbines, are formed of such composite materials.

One major development in this field has been the automation of ribbon placement. Prior to that development, fibre layup was performed manually, requiring many touch hours to produce large parts. Automated ribbon placement (ARP) provides more consistent parts by providing laborious tasks with robotics. Two well-known examples of automated ribbon placement are termed Automatic Fibre Placement (AFP also known as Advanced Fibre Placement), and Automatic Tape Layup (ATL). Herein automated ribbon placement covers these and like techniques that involve applying a ribbon of oriented fibres that are unified (e.g., with a polymer resin, such as epoxy or PEEK to define a prepreg), where the application is accomplished by: placing the ribbon (s) against a surface of a mandrel, tooling, or mold face (or a previously deposited material thereon) by pressing the ribbon(s) against the surface; all the while having a cutter in place to cut the ribbon (or the ribbons, either individually, or jointly) at any point during the laying, while moving the ribbon(s) with respect to the surface to guide the deposition in a desired pattern on the surface. Preferably the ribbons are treated for example to soften or tackify them prior to the pressing, to improve adhesion of the ribbon or increase its conformability. A robot with an end effector (head) may perform all of these functions, treatment, pressing, cutting, and include at least part of a ribbon feed system, as in the case of the various commercially available AFP and ATL robotic heads, although this is not necessary. Herein AFP head, ATL head, and ARP head are robotic end effectors, adapted to be mounted to a kinematic machine with at least 3 degrees of freedom (DoF) that is controlled electronically (hereinafter referred to as a robot) so that the robot can control a trajectory of the head (position, orientation, velocity) and a force applied to consolidate the composite part being built.

The robotic placement is a huge advance, permitting deposition according to a Computer Aided Design (CAD) of the part. The technique is very cost effective, and deposition of fibre ribbon encompassing widths as large as 16 inches can be currently done at a speed up to 2000 inches per minute (50 metres per minute or about 1 metre per second).

It is therefore not surprising that, according to Wikipedia, half (by weight) of large commercial aircraft (Airbus A350 XWB, Boeing 787 Dreamliner) that are currently being produced are carbon fibre-reinforced polymer composites.

Although deposition is very efficient, stringent requirements that products be free of defects, greatly impede the efficiency of the over-all process that includes quality assurance (QA), and documentation of the process. Some flaws do occur during the layup. Some of these defects could be significant, either individually or by their number or density. In such cases the manufactured part has to be repaired or rejected. Possible defects include the following: an unwanted gap or overlap between adjacent ribbons; a missing ribbon; a twisted or folded ribbon; a protruding and loose ribbon; inaccurate start and stop locations of ribbons; a foreign object or debris; or an adhesive droplet at the surface, for example. The potential for such defects require inspection by an operator after each ply is deposited. It is known to use hand-held scanners (see U.S. Pat. No. 5,963,660), and magnifying glasses for manual inspection of layers of tows in automated layup systems.

There is no currently available on-line or on-the-fly inspection system capable of inspecting and detecting these defects during the lay-up to eliminate the time consuming and labor intensive visual inspection. The costs of QA are a substantial fraction of the costs of the parts, representing over ¼ of the cost of the product. The same Wikipedia page states that while much of these aircraft are made of the CFRP: " . . . many delays have pushed order delivery dates back because of problems with the manufacturing of these parts. Many aircraft that use CFRP have experienced delays with delivery dates due to the relatively new processes used to make CFRP components . . . ". The delays are attributable to QA, as the time taken by robots to lay-up ribbons is small.

The National Center for Defense Manufacturing and Machining (NCDMM) of USA selected Ingersoll Machine Tools as its partner on an Air Force Research Laboratory project (public release by NCDMM May 16, 2013). Later, the company ATK was selected to be associated with a phase 2 of the project (public release on Feb. 27, 2014 by Camozzi Machine Tools). Both documents espouse that inspection with an automated system would occur in real-time, while the composite structure is being fabricated, and the system can electronically document and track defects. The only system currently available for on-line or on-the-fly inspection, is upstream of the deposition. The system is called Real Time Inspection System (RTIS). It inspects the tows before being laid down using a Laser light section sensor (public release on Mar. 8 2013 by Camozzi Machine Tools). The contrast between the surface of the tows and a white background makes it relatively easy to identify tow defects such as, twists, breaks, splices, and tows out of tolerance. While this is real-time inspection, there are a host of deposition flaws that cannot be monitored in this way (gaps, overlaps, incorrect start or end of tow), as the measurements are not made with respect to the deposited surface, but with respect to the tow before deposition. It is rather difficult to obtain a surface topography with a carbon black tow on a carbon black background (other tows), especially at the speed at which tows can be laid down with commercially available machines.

U.S. Pat. No. 7,835,567 also to Ingersoll Machine Tools teaches an image-based system for on-line imaging and defect detection. This invention is about comparing virtual and visual images to detect defects. The patent states that "the invention may be practiced with a variety of different types of vision capture sensors, including: laser sensors; cameras; two dimensional and three dimensional sensors; scanners; etc. The patent specifically illustrates an exemplary embodiment of the vision capture element mounted directly on a fibre placement machine, in close proximity to a compaction roller of the fiber placement head. The compaction roller is not illustrated, denying any sense of how "close". The vision capture element utilizes a spread beam, which provides a two dimension linear profile image of a portion of the composite structure.

The statement that a variety of vision capture elements can be used in the practice of that invention to the stated purpose of determining proper formation of the structure with comparison of the visual image with the virtual image, is false. To Applicants knowledge, no demonstration of camera-based image detection has been shown to be possible in real-time, regardless of illumination system used. Applicant has also found that laser triangulation is generally not a sensitive enough technique, on a black background and is difficult to interpret. Even if the sensitivity and interpretation issues could be resolved, triangulation systems (which are the imaging systems most frequently used in this art) require a separation of source and detectors making these systems inherently bulky. This issue is not shown (a relatively tiny vision capture element is schematically shown) or addressed in U.S. Pat. No. 7,835,567. Incorporating a compact laser triangulation system onto an ARP head without limiting the mobility of the placement machine would present a formidable challenge. There is no teaching or suggestion in the application or available at the date of this patent of any sensor system that can fulfill the requirements.

Furthermore, 5 years after the filing of U.S. Pat. No. 7,835,567, Jan. 18, 2012, Ingersoll Machine Tools submits a proposal for on tool inspection of automated composite material placement. Section 2.6.1 compares inspection on-the-fly versus post layup inspection. It is acknowledged that on-the-fly is the most desirable since it does not slow the manufacturing process, but because it requires the inspection hardware to be mounted on the placement head, it increases its mechanical envelope, which could cause collisions for deposition on complex parts. Ingersoll Machine Tools considers only laser-based triangulation systems, which, as mentioned above, are rather bulky and cannot in practice probe close to a compaction roller. This causes many difficulties for highly contoured parts. As a consequence Ingersoll Machine Tools specifically recommend not performing on-the-fly measurement of the deposited tows, but rather suggest post layup inspection with a robotic arm mounted on the AFP machine, or a separate metrology system. This approach, although a notable improvement compared to visual inspection, has the drawback that it still significantly slows down the process, since each deposited layer has to be inspected before the next one could be deposited.

Researchers at Aachen University (published article in 2010 SPIE Conference proceedings) have used laser triangulation to scan a surface of a mold to generate the exact mold geometry prior to tape deposition. Furthermore, they suggest two laser line triangulation systems (one before the pressure roller to detect edges of the last-deposited tow, and one after the pressure roller to identify gaps, etc. in the newly laid tow). The former appears to be the subject of EP2639048. This paper teaches a technique to distinguish the location of the tape edges after deposition by using a data fitting algorithm. Demonstration of the process was performed as an off-line process with a camera and laser that are advantageously positioned to this effect.

There are several unnoted disadvantages with this system, mostly due to the bulkiness of the sensor that is necessary given the separation of the camera and laser (required by laser triangulation systems), and also because of the speed at which a laser line scanner can acquire data (p. 8 notes a 5 ms exposure time is required to acquire sharp images, which corresponds to nearly 5 mm of translation at typical operating speed). The arrangement of the laser is shown perpendicular to the surface, which is ideal for a bright illumination, but may be problematic for operation of currently operated ribbon placement heads. Note that a sensor device as shown in FIG. 3b presents a considerable encumbrance for operators because the whole sensor box juts out of the head in a way that risks being damaged if the tows were not planar (as shown). The jutting out of the sensor requires a substantial change in the working envelope of the head, and a substantial narrowing of the range of processes (tooling configurations) the head can perform, as collision with the head must be avoided, which will be a serious limitation for building up complex geometries. Despite the conclusion that it is possible to measure prepreg tape deposition accurately and quickly enough for in-process contour scanning using the triangulation process (with a relatively high uncertainty for optically challenging materials) and the statement that metrology is the key to an economically feasible industrialization of FRP in serial production, since 2010 Applicant finds little evidence of advance to this end.

Applicant notes that a substantially more recent publication from Germany Krombholz et al. 2013 suggests that a sensor-based process to control and monitor the layup quality in a fibre placement production hasn't been realized yet, citing poor accessibility during draping processes with optical measurement systems. The paper presents a "sensor concept". The suggestion is that a "much higher resolution" laser light section sensor (presumably than the forerun sensor) is stated to be used to determine edge contours of tows as they are deposited, although no description of any sensor technology that can accomplish this task is explained or presented, no image of such a sensor is provided, and no evidence is provided that any solution to this problem is overcome by the sensor concept.

U.S. Pat. No. 6,871,684 to Engelbart et al. teaches a system for identifying defects in a composite structure. The system is on-line in that it produces one or more images during the deposition, and allows for variation of illumination or field of view during the deposition. The use of two or more light sources optimally arranged for a particular imaging task, and infrared light sources are particularly mentioned. Engelbart et al. indicate that if the composite structure is not planar, the inspection should be as close to the pressure roller as possible, and if the composite is planar the inspection point can be located further from the pressure roller. The illumination system added to the ARP head is shown positioned to be satisfactory for flat (FIG. 1) or singly curved convex contoured parts (FIGS. 4,5) but would be incompatible with doubly curved parts or concave parts if deposition of tows is allowed in any direction. The system will therefore impose new limits on the conflict-free operating limits or envelope of the placement machine. It is unclear: how much design work is required to modify an illumination system for each change in part; how accurately edges or defects can be detected with these systems; and how rugged such systems can be in practical industrial settings, where ambient lighting varies, and vibrations are induced. Since 2005, this system does not appear to have been commercialized.

In a disparate field, optical coherence tomography OCT has been known, at least for the last 25 years, to be used for profilometry, in one form or another. A very high precision (as good as 50 nm) multi-interface profilometry was demonstrated for the dynamic monitoring of roughness formation in varnish drying applications using OCT profilometry by Lawman et al. Lawman notes that no anti-vibration devices were required, which may not be surprising given that the work was performed in a laboratory. Given the noise, the challenges with deposition angles available on ribbon placement heads, and the optical properties of composite parts formed by ribbon placement, it was not obvious that OCT profilometry could be effective for measuring topography of such surfaces at a rate that is fast enough, and with sufficient accuracy, to allow for monitoring of automatic ribbon placement.

Accordingly there is a need in the art for a technique for inspecting automatic ribbon placement during the deposition of the ribbon, where it is applied on a surface of a composite part. Thus the inspection is on-line and on-the-fly. The need is especially strong for inspecting optically challenging materials, by mounting a sensor to an ARP head without extending the head's envelope, or reducing an operating speed of the deposition and the whole manufacturing process.

SUMMARY OF THE INVENTION

Applicant has surprisingly discovered that OCT profilometry produces enough useful topographical information, quickly enough during the manufacturing process, even at a range of incidence angles, for automated inspection of ribbon deposition and identification of defects. The profilometry has been demonstrated on CFRP surface, which is notoriously difficult because of its high absorption and the similarity of the under layers with the newly deposited ribbon. The OCT profilometry sensor probes can be substantially more compact than laser triangulation sensors, and can be added to heads with no or minimal extension of the head envelope. Applicant has demonstrated operation of an AFP robotic head, with sufficient inspection data to verify ribbon placement without slowing the automated layup process.

Accordingly, an automated process for online monitoring of Automated Ribbon Placement ARP is provided. The process involves: feeding a ribbon while providing robotic control to move an applicator against a previously deposited layer composed of one or more ribbons, to press the ribbon against the layer to build up a fibre reinforced composite; scanning a beam of light across a surface of the ribbon at a first location of the ribbon after the pressing, while the same ribbon is being pressed on the layer at a second location, the beam illuminating a spot on the surface; collecting light scattered from the spot to obtain a sample beam; directing the sample beam and a reference beam onto a photodetector, to obtain an electrical interference signal; receiving a plurality of the electrical interference signals that characterizes a topography of the deposited ribbon on the surface; and processing the plurality of the electrical interference signals to identify whether a deviation from a planned lay-up of the ribbon is manifest.

Collecting the scattered light may involve collecting back-reflected light from the first location. Scanning the beam and collecting the light may be jointly performed by an optical device mounted to a robotic head that includes the applicator. The optical device may be statically mounted to the robotic head, whereby the first and second locations have constant separation except for a bounded variation caused by a tilting of the robotic head, and the optical device is centered on the ribbon except for a bounded variation caused by a steering of the ribbon. Alternatively a mechanism may be provided for moving a probe mounted to the robotic head relative to the robotic head, for example to improve an alignment of the image.

Scanning preferably further includes line scanning the spatial illumination pattern in a direction that is generally transverse to the ribbon, whereby, in each cycle of the line scan, the spatial illumination pattern illuminates at least part of a width the ribbon including at least one edge thereof.

Processing the interference signals may involve comparing a topographical map of the surface of the part with a Computer Aided Design CAD specification of how the part is to be built up. Processing the interference signals may be based on the processing of a single scan, a combination of successive scans, or a combination of scans on adjacent regions.

The electrical interference signal may include tomographic and topographic information that collectively characterize the topography of the surface and the ribbon. The electrical interference signal may be a SS-OCT signal, and may use balanced detection.

The ribbon may be composed of high absorption, carbon-fibres.

Also, accordingly, an automated process for online monitoring of Automated Ribbon Placement (ARP) is provided. The process involving pressing a ribbon against a previously deposited layer composed of one or more ribbons to build up a fibre reinforced composite part; obtaining an optical coherence tomography (OCT) profilometry signal that characterizes a topography of the deposited ribbon while the same ribbon is being pressed on the layer at a different location on the part; and processing the signal to identify whether a deviation from a planned lay-up of the ribbon is manifest.

Also, accordingly, an apparatus for online monitoring of Automated Ribbon Placement (ARP) is provided. The apparatus includes an interferometric topographic sensor including a probe mounted to the ARP head, and positioned to inspect a ribbon after deposition by the ARP head, and to output a coherence scanning interferometric signal that characterizes a topography of the ribbon after pressing; and a processor adapted to: receive the coherence scanning interferometric signal, process the signal to determine whether a planned lay-up is defect free; and in the event that a defect is identified, issue a digital signal for remedial action.

The apparatus may further include the ARP head that has at least a part of a ribbon supply for feeding a ribbon composed of a carbon fiber reinforced polymer (CFRP); a ribbon cutter for cutting the ribbon fed through the part of the ribbon supply; and an applicator for pressing the fed ribbon against a tooling to build up a CFRP composite part, under a control and guidance of the robot.

The interferometric topographic sensor may be an OCT sensor with a sampling rate above 50 KHz, with a scan depth of at least 1 cm. The interferometric topographic sensor may be a Swept Source OCT sensor.

Also accordingly, a kit for adapting an Automated Ribbon Placement ARP head for online monitoring is provided. The kit includes an interferometric topographic sensor adapted to generate an electronic interferometric signal; at least one of instructions and mounting supplies for mounting the sensor to the AFP head at a position and orientation to record a topography of a surface of a ribbon after deposition; and program instructions that, run on a processor enables to processor to: process the interferometric signal in real-time to obtain topographical information characterizing the ribbon after deposition; and use the topographical information to determine whether a planned lay-up is being executed flawlessly, or whether a defect is present.

The kit may further include the ARP head, which has at least a part of a ribbon supply for feeding a ribbon composed of a carbon fiber reinforced polymer (CFRP), a ribbon cutter for cutting the ribbon fed through the part of the ribbon supply; and an applicator for pressing the fed ribbon against a tooling to build up a CFRP composite part, under a control and guidance of the robot. The interferometric topographic sensor may be an OCT sensor with a sampling rate above 50 KHz, that can traverse a distance of at least 1 cm per second. The interferometric topographic sensor may be a Swept Source OCT sensor.

Also accordingly, a method for automated online inspection of manufacturing of a fibre reinforced polymer composite part during Automated Ribbon Placement (ARP) is provided. In accordance with the method: a light beam from a light source is scanned over a surface of the part where a first location of a ribbon has been pressed against the part to build up the part, while a second location of the ribbon is being pressed against the part; and light scattered by the surface is collected along the direction of the light beam and processed in real-time to detect deviations from a planned lay-up for the part, to identify defects, whereby identified defects can be used for quality assessment and control of the ARP.

The real-time processing may involve applying interferometry to produce a surface topography of the part including an edge of the ribbon at the first location, by directing the collected scattered light to interfere with a reference beam, and detecting an interference pattern with a photodetector in accordance with Optical Coherence Tomography, low-coherence interferometry, or white-light interferometry.

The real-time process may include a determination of a light power scattered by the surface. The reference beam may be from the light source, or from a second source of illumination. The scattered light may be collected with either a same, or a different, optical setup that is used to scan the light beam optical setup.

The real-time process may use undifferentiated tomographic and topographic data to detect the deviations. The defects to be identified may be one of the following: a gap between adjacent ribbons; an overlap between adjacent ribbons; a missing ribbon; a twisted ribbon; a folded ribbon; a protruding or loose ribbon lacking adherence to the part; a protruding ribbon that does not fill a radius of a concave region; a wrong location of a start or end of a ribbon; a splice along a ribbon; a foreign object or debris at the surface; or an adhesive droplet at the surface.

The planned layup may be defined by a computer aided design CAD drawing of the part at the stage in production, and quality assessment may include a comparison of the surface topography with the expected CAD drawing.

Controlling the ARP may involve identifying a particular defect and applying a corrective measure associated with the identified defect.

Scanning the beam of light over the surface may involve moving an optical device mounted to a robotic head that performs the pressing, whereby the optical device emits the illumination at a fixed distance behind an applicator of the robotic head that performs the pressing. Scanning the beam may further involve line scanning in a direction generally transverse to the ribbon, the line scanning being provided by a galvanometer, a MEMS, a rotating polygon, or a resonant scanner. The line scanning may be provided in several sections and all the sections may be combined to provide a line scan over a broader width.

The light beam may be kept within 100 mm or 1 diameter of a pressure roller of the ARP head from the pressure roller, or from ⅓ to 3 times a radius of the pressure roller, more preferably from 2/5-5/2 the radius, and more preferably from half to twice the radius. The light beam may have an angle of incidence on the surface of 0-75°, more preferably 20-70°, more preferably 30-60°, more preferably 40-55°.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Herein a technique for inspecting automatic ribbon placement is described. The technique involves OCT profilometry, and can be used on an ARP head without, or with minimal restrictions to the movement of the ARP head.

Figure 1:
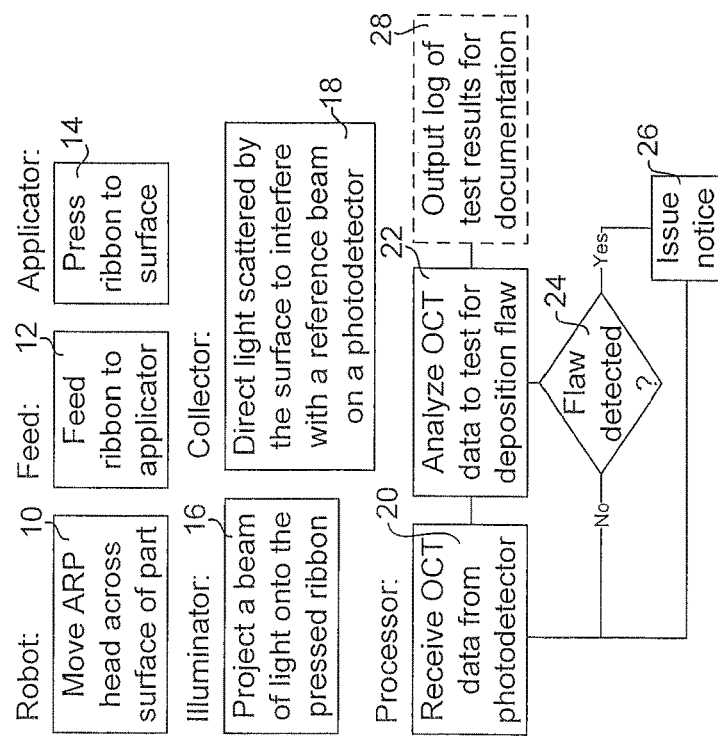
FIG. 1 is a schematic process flow diagram showing principal steps in a distributed process in accordance with an embodiment of the present invention.

FIG. 1 is a schematic illustration of a process for on-line inspection of an automatic ribbon placement (ARP) head. The process involves the lay-up or deposition process of the ARP head, as well as an illuminator, collector and processor that operate concurrently, though on different locations of the deposited ribbon. Thus the ARP head has at least 3 functionalities, that are by no means necessarily independent: a robot moves the ARP head across a surface of a composite part that is already built up to a certain extent 10; the ribbon is fed 12; and the ribbon is pressed to the surface 14. The robot movement may involve steering, i.e. applying a curvature to the ribbon with a suitable tensioning of the ribbon and moving the head in a certain direction, as is well known in the art. Steering may be required to shape the ribbon for placement on a tooling that has a complex geometry, for example. A resistance of the feed may be required to allow for the shaping. In some embodiments, in accordance with the automated fiber placement (AFP) process, the ribbon may comprise a number of tows that are independently added and dropped with ribbon feed roller and cutters. For example, band of 8-32 tows that are each $1/8^{th}$-$1/2$ inch wide, and a thickness of 0.14 mm, are fairly common. In other embodiments, in accordance with the automated tape layup (ATL) process, the ribbon is a single tape, and in some cases greater flexibility is provided for in the cutting of the ribbon at angles, etc. The applicator is adapted to apply a pressure, in the form of a roller, roller system, track, or sliding pressure system (in current practice, rollers are used) that is adapted to apply a controlled pressure to the ribbon, to conform the ribbon to the surface. The applicator may further include a heater, or other device, to tackify a neat polymer that may be imbedded in the ribbon (prepreg, or otherwise applied), applied over the surface of a previously laid-up layer (e.g. as a sheet, or sprayed on), or embedded in the previous layer.

While the ARP head is depositing the ribbon, an illuminator and collector are provided downstream of the applicator, to inspect the laid-up ribbon. The illuminator projects a beam of light onto the pressed ribbon 16. The beam of light may be from a monochromatic laser, but is preferably a white light, or frequency swept source such as provided by lasers and diodes, that allows for imaging over at least one range of frequencies, and the process may further involve using a source to generate the beam.

The use of a beam of light as opposed to other illumination patterns is to ensure that a spot small enough to provide a desired imaging resolution is provided. In accordance with the present invention, a spot is smaller than $1/10^{th}$ a width of the ribbon in the transverse direction, and is smaller than twice a maximum ribbon deposition speed times a scan period (the duration of the transverse scan). In principle the beam can be as small as desired, as long as a complete coverage of the surface is not required. Coverage refers to a fraction of the surface being illuminated at one point during a scan, which fraction may be more than one, if oversampling is performed. The beam provides a high-contrast spatial illumination pattern so that light is not smeared over a large area, but tightly focused on the spot. If CFRP is used, a small fraction of the light striking the surface is reflected, but applicants have found that the OCT system they used provides enough sensitivity even when interrogation of the surface is performed at a substantial angle.

The beam illuminates the surface or the ribbon just added thereto, scattering and back-reflecting at least some of the beam. The back-reflected light from the first surface or ribbon is collected by the collector 18. As is conventional in OCT, the collected light is referred to as a sample beam, and the sample beam is made to interfere with a reference beam on a photodetector, to obtain an electrical interference signal, which is understood to be OCT data, which is typically produced in a data stream. There are a wide variety of OCT systems that can be used, each with respective optical components, and signal processing known in the art. There are generally three types of OCT systems: swept source SS-OCT (which is also known as optical frequency domain reflectometry, frequency modulated continuous wave lidar); spectral domain OCT, and time domain OCT. Current time domain OCT systems provide the slowest sampling rates, typically on the order of 1 KHz, which are generally not sufficient for current purposes. Current spectral domain OCT can provide high sampling rates (equivalent to SS-OCT) but the depth range of the measurements is limited to a few mm, which is generally insufficient. SS-OCT can support sample rates of 100 KHz over a depth range that is sufficient to measure a profile of a ribbon as it is being deposited. An OCT system that allows for measurement at a rate of at least 10 KHz spaced across a width of at least a tow can be used.

It is generally inconvenient and difficult to plan movements of an ARP head with a statically mounted illuminator and collector at a distance from the surface, given the occlusion of the surface by the robot, and the difficulties obtaining timely profilometry data. Similarly, it is difficult to coordinate movement of both an ARP head and a separate robot-mounted metrological system. Neither of these are required in the present invention. The illuminator and collector can be mounted to the ARP head to inspect the ribbon right after the applicator has applied the ribbon, without having to wait for the bulky ARP head to provide a line of sight. As such, the beam may be projected by scanning the beam over the surface of the ribbon with the same robotic motion. Furthermore, scanning the beam may involve line scanning the beam in a direction that is nominally transverse to the ribbon, whereby, in each cycle of the line scan, the beam illuminates at least part of a width the ribbon including at least one edge thereof. Scanning can be accomplished by moving a reflector or other optical component, in a linear, rotary, or coupled motion.

In some embodiments both the illuminator and collector are collocated in a common body of an optical device, so that the illuminator and collector may share optical components, such as focusing optics and waveguides, although this is not required. The optical device may be statically mounted to the ARP head, whereby the position where the ribbon is sampled will have a constant separation from the applicator, except for a bounded variation caused by a tilting of the robotic head. The optical device may be centered on the ribbon except for a bounded variation caused by a steering of the ribbon. If either these bounded variations are not acceptable for a desired lay-up process, a device with one or more degrees of freedom may be used to recenter the optical device on the sampling position in response to a change in tilt or steering.

The OCT system (including an OCT source interferometer, photodetector, and data processor, as well as the optics may all be mounted at the end of the ARP head. This allows for a self-contained robot-mounted sensor. Alternatively, if one or more of the optical source, the interferometer, or the processor, makes the system too bulky, one or more electrical and optical connections between a mounted OCT probe and a stationary OCT system may be provided. For example, the photodetector may or may not be mounted to the OCT system. If mounted, an electrical signaling link may couple the mounted part to the processor for analyzing the data. It will be appreciated by those of skill in the art that digital signaling has some advantages over analog signaling in that attenuation, dispersion, and signal noise can all but be eliminated. To save an OCT source from vibration it may be preferred to keep it in a stationary location, which would require some kind of a waveguide to transmit the illumination to the mounted part of the OCT system, and optical fibre is proposed. In particular, an optical path length of the interferometer may be reduced by supplying the beam from a stationary OCT source, but including all optical components, the photodetector, and enough of a digital signal processor to digitize an electronic interference signal. It may also be preferable to keep the OCT interferometer stationary, as it may increase the bulk of the mounted part of the OCT system. If the OCT interferometer and source are stationary, optical communications would be required from the source to the mounted part, and back. A same optical fibre can be used for transmissions in both directions.

The electrical interference signal is processed, for example by optical to electrical signal by a photodetector, and then with an analog to digital converter to obtain a data stream of (digital) OCT data, that is correlated to measurement points on the surface, to generate information for determining whether flaws in the layup of the ribbon are manifest. Herein one or more of: a digital signal processor, a computer peripheral card, and a general purpose computer is referred to as a processor, and may perform such data processing. The processor, receives the OCT data from the photodetector 20, analyzes the OCT data to test for a deposition flaw 22, and if one is detected 24, issues a notice 26. Optionally all OCT data is stored, a set of analytical results of the OCT data is stored, or all flaws and location information, is stored for documentation, such as with a traveler document that accompanies with the part once produced 28.

Applicant has found that the OCT data is sufficient to characterize a topography of the deposited ribbon on the surface. Applicant has taken raw data from a commercially off the shelf SS-OCT system (Novacam Technologies, with the software replaced by purpose built software), provided a new optical device, and tested the resulting system finding that a topographical map of the surface can be readily provided. The OCT data may include tomographic and topographic information that collectively characterize the topography of the surface and the ribbon. It has not been agreed upon whether some of the OCT data provided by the system is tomographic or not, but it is agreed upon that the data clearly characterizes the topography.

Analysis of the OCT data may involve production of a topographical map, which may be part of the output log. The analysis may involve identifying a set of flaws. These may be precharacterized patterns in the OCT data, such as variations in width and profile height of the ribbon (or tows thereof), with simple thickness variation parameters as a test of the OCT data. Artificial intelligence programs may also be trained to identify defects without specifying precharacterized flaw patterns, for example by defining useful metrics for comparison with correct deposition patterns. Alternatively specific tests for gaps, overlaps, twists, bubbles, curling, splices, foreign debris, beading, or other precharacterized flaws may be identified.

Analysis may follow a Computer Aided Design CAD specification of how the part is to be built up. As CAD specifications are generally required for ARP processes, it is natural to use these to generate specific tests for the deposition. The tests may be determined in a fully automated manner, or with any amount of test designer input, and may further involve existing process data. The testing may be defined with respect to established tolerances for the process.

Analysis preferably comprises processing a plurality of electronic interferometric signals associated with several to many data points, as relative measures are more indicative than individual measures. A process for filtering out anomalous points may be used, and in general, as a very high number of data points may be obtained, the loss of even 30% may have no noticeable effect on the data presented. Iterative tests may be generated based on the processing of a single linear scan (corresponding to a single transverse section of the ribbon), a combination of successive scans, or a combination of scans on adjacent regions.

Figure 2:
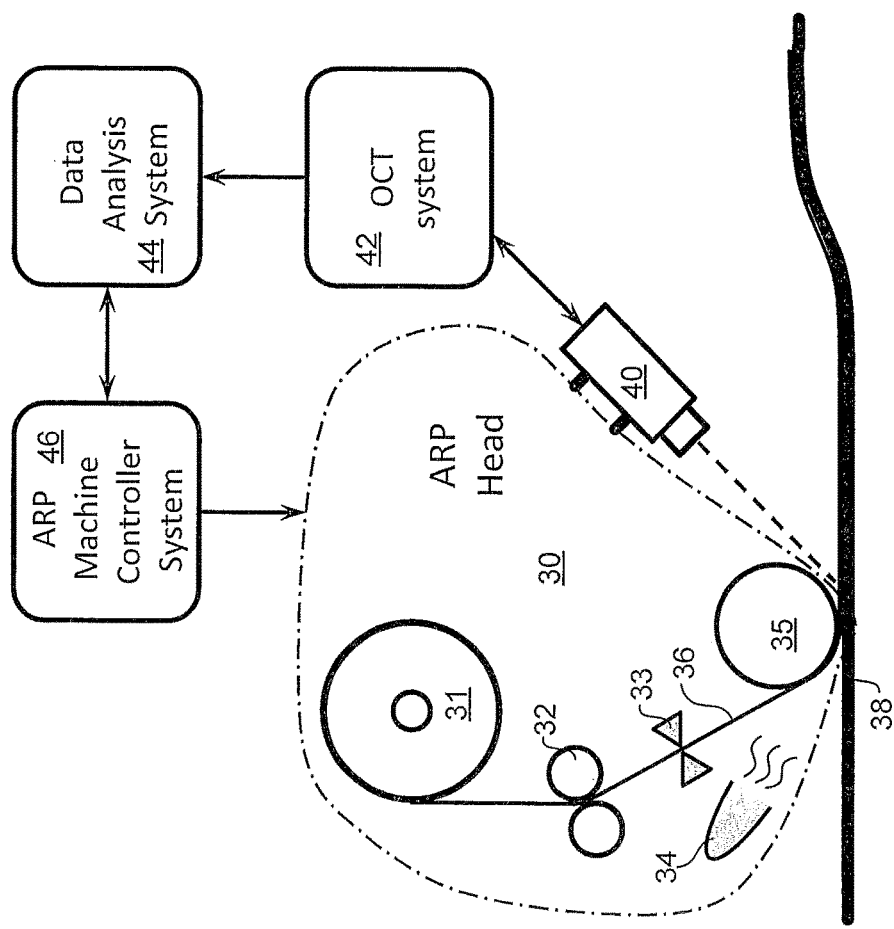
FIG. 2 is a schematic illustration of an apparatus in accordance with an embodiment of the present invention, mounted to an ARP head.

FIG. 2 is a schematic illustration of an apparatus in accordance with an embodiment of the present invention. The apparatus comprises an ARP head 30, schematically illustrated having a ribbon roll 31, a set of guide rollers 32, a cutter 33, a heater 34, and an applicator 35, although the heater 34 may not be essential to the ARP head 30, and the roll 31 need not be mounted within the ARP head 30, despite the advantages to a self-contained ARP head 30. While the applicator 35 is schematically illustrated as a roller, it will be appreciated that conformable rollers, or other structures that distribute a load in a concentrated area can be used, and are particularly necessary for processes that apply ribbons on surfaces along directions that are not substantially flat in the transverse direction. The applicator 35 is shown contacting a ribbon 36 and pressing the same against a composite part being built 38.

In use, the ARP head 30 has a set of ribbon handling devices, including the roll 31, guide rollers 32, and cutter 33 for delivering a ribbon (a single tow, band of tows, slit tape, or tape) to a deposition region with a guiding system. The ribbon is heated, for example with hot gas from a nozzle, or an IR lamp, to tackify the ribbon, and the ribbon is placed against the part 38 where it is compacted by the applicator 35. Typically each ribbon is deposited next to a previously laid ribbon, atop a previous layer of the ribbons. This is why it is difficult to inspect deposition when the ribbons are highly absorbing, like CFRP is, and the previous layers are likewise highly absorbing.

Attached to the ARP head 30 is an OCT probe 40 containing at least optics for focusing a beam of light onto a surface of the part 38 and the ribbon 36. As such it contains the illuminator and collector described hereinabove. The OCT probe 40 is positioned on the ARP head 30 on an opposite side of the applicator as the ribbon supply so that the probe is positioned to follow the deposited ribbon 36. The OCT probe 40 is in communication with an optical coherence tomography (OCT) system 42 which is adapted to guide light collected by the collector of the OCT probe 40 (preferably back-reflected light) and a reference beam, into a photodetector of the OCT system 42, so that the interference between the sample and reference beams is detected and converted into a digital signal. The OCT probe 40 and OCT system 42 is therefore one embodiment of an interferometric topographic sensor in that it uses interferometry to determine a topography of the part 38.

The OCT system 42 outputs data to a data analysis system 44 which includes the processor described hereinabove. It will be appreciated that the notice issued by the processor at step 26 could be sent to a user, a control workstation, or communicated to a person overseeing the production of the part 38, but in some embodiments it is preferable to at least notify a system 46 responsible for controlling the ARP machine (understood to be the ARP head and the robot taken together). At least if certain flaws are detected, it is more efficient to stop the process, than to continue, for example when all of the work after the flaw will have to be wasted, and increase a time required for remediation. In some embodiments the ARP machine controller system 46 is equipped with instructions for handling specific identified flaws, and can automatically back off the ARP head 30 to a position where there is no flaw, effectively peeling off flawed material from the surface, cut the ribbon at that location and resume the procedure, however this requires good integration between the ARP machine controller system 46 and the data analysis system 44.

It will be noted that the present invention may be embodied as a kit containing the OCT probe 40, OCT system 42, and data analysis system 44 with user instructions or mounting supplies for mounting at least part of the OCT system (including the probe) to an ARP head 30 at a position and orientation to record a topography of a surface of a ribbon after deposition.

Figure 3:
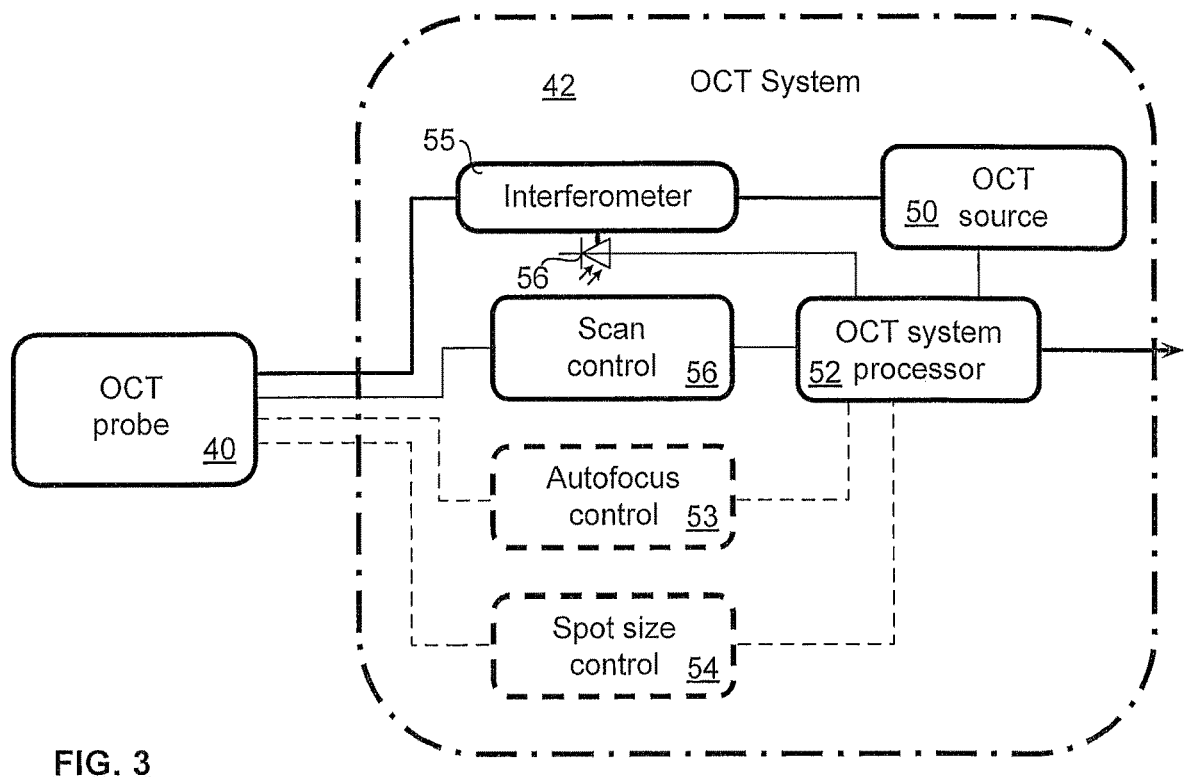
FIG. 3 is a schematic illustration of an example of an OCT system in accordance with the present invention.

FIG. 3 is a schematic illustration of an OCT system 42 in accordance with an embodiment of the present invention. The OCT system 42 includes an OCT source 50 which may be a laser, or a bright diode or array thereof, which is preferably controlled by an OCT system processor 52. An interferometer 55 provides waveguides for tapping light from the OCT source 50, supplying the optical power to the illuminator of the OCT probe 40, receiving the collected light from the collector of the OCT probe 40, and projecting both the tapped light and the collected light onto a photodetector 56, schematically represented as a photodiode.

The electrical interference signal generated by the photodetector 56 is received by the OCT system processor 52, and is forwarded to the data analysis system 44.

The OCT system processor 52 may identify features of the data to perform feedback loops to control such functions as autofocus 53, and spot size 54, with attendant control optics in the OCT probe 40. For example, in probes adapted to scan in a line transverse to the direction of travel of the ARP head 30, an optical path length may vary as a position in the scan line between the probe 40 and the illuminated surface. This may cause a measure of defocusing of the light beam, that would otherwise impact or degrade the signal quality. If such control optics are already available in the OCT probe 40, an optimization algorithm may be used to constantly vary the focus to provide a best focus from a measured amplitude in the electrical interference signal. Even if the OCT probe 40 does not vary a distance to the surface, an unevenness of the surface may have the equivalent effect. As long as the variation is gradual enough, an autofocus control 53 may account for such variations. Similarly, if a spot size is controlled by control optics in the OCT probe 40, an optimal spot size may be determined.

Preferably the OCT probe 40 is equipped with control optics to scan the beam in a direction perpendicular (or substantially perpendicular) to the direction of travel. This allows for a number of measurement points to be taken across the ribbon 36, which is important for obtaining a profile. The scan can, in principle be performed by any number of beams concurrently covering off different points on the ribbon 36. In the extreme there is one beam per spot, but if so, care must be taken for collection of light of one band of wavelengths from one spot at a time, and accordingly, there is a need for some form of scanning, unless separate wavelength regions are used at each spot on the transverse line. Scan control 56 is provided to signal control optics within the OCT probe 40 to direct the line scan. The scan control 56 may have a cyclic command signal to the control optics, and may gradually vary, for example by analyzing the electric interference signals to recenter the transverse line, on the desired ribbon, in response to steering of the ribbon deposition, or accumulated variation over time.

Figure 4A:
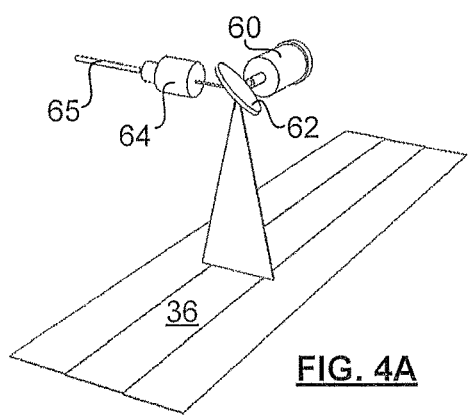
FIGS. 4A,B,C,D,E are schematic illustrations of examples of OCT probes in accordance with the present invention, featuring respectively: a galvanometer mirror; a polygon mirror with two illumination subsystems; a small displacement actuated mirror and a bi-telecentric lens; a linear displacement motor with a mirror and lens arrangement; and a MEMS mirror with a F-theta lens or a F-theta telecentric lens.

FIG. 4A is a schematic illustration of a first embodiment of a scanning system for an OCT probe 40. The control optics in this case are a galvanometer (motor) 60 coupled to a mirror 62 for controlled pivoting of the mirror 62. It will be appreciated that the galvanometer 60 may be designed for operation in a resonant mode, which provides faster scanning. The beam is received from an autofocus/spot size adjustment device 64 that is coupled to an optical fibre 65. Thus the beam passed by the OCT interferometer from the OCT source 50, is conveyed through optical fibre 65, and passes through the focus/spot size adjustment device 64. The light is emitted to free-space, reflects off the mirror 62 over a narrow range of angles (around +/−12°). As the optical path length from the mirror to the part 38 varies with this angle, a fixed focus of the beam leads to a blur, and/or enlarged spot size at different positions, which is corrected by the adjustment device 64, if needed.

Figure 4B:
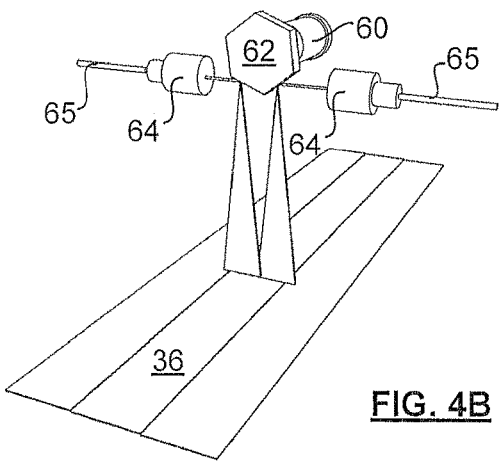

FIG. 4B is a schematic illustration of a second embodiment of a scanning system for an OCT probe 40. Herein similar features are identified with the same reference numerals, and descriptions of like features are not repeated for each drawing in which they are illustrated, except to note how they are different. The second embodiment of a scanning system comprises two optical fibres 65, and a polygonal mirror 62, having six mirror faces disposed at different angles. A rotary motor 60 is used instead of a galvanometer, in this embodiment. It will be appreciated that stability of the continuously rotating motor is generally higher than that of the galvanometer, and may be preferred for that reason. The two mirror faces of the polygonal mirror 62 allows for concurrent scanning of the two beams with a single motor, and allows for the coordinated linear sweeping of the two beams in the same direction (which ensures a minimal separation of the beams). It will be appreciated that multiplying a number of mirror faces or mirrors and beams can be performed with the other embodiments of scanning systems disclosed herein. Obviously a scheme in which a single input fiber 65 can be used, if the scan width obtained is sufficient for the purpose.

Figure 4C:
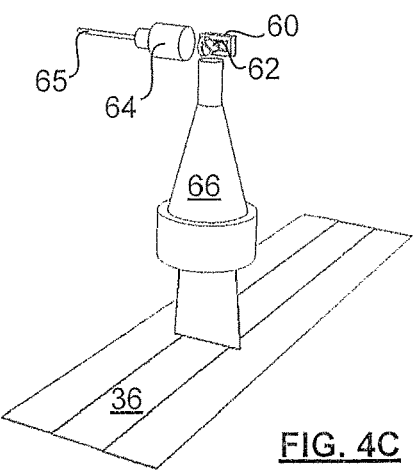

FIG. 4C is a schematic illustration of a third embodiment of a scanning system for an OCT probe 40. A small displacement actuator 60 (piezoelectric, voice-coil, galvanometer, etc.) provides for a controlled displacement of the mirror 62. Alternatively to a prismatic joint, a small amount of angular displacement may also be applied by the small displacement actuator 60, and a combination of the angle and position of the beam entering a beam correction lens 66 (e.g. a bi-telecentric lens (if no angular sweep is provided by the actuator 60), or otherwise an F-theta lens, or F-theta telecentric lens) ensures a substantially larger variation in the beam sweep. The lens 66 is used to translate the beam from the mirror 62 and bend the beam so that at any angle of the mirror 62, the beam output by lens 66 is substantially parallel. This ensures that for a surface of the part that is substantially normal to the linear extent of the lens, that there will be no deviation in the distance caused by the beam's geometry. It will be appreciated that the lens 66 may be a useful addition to the other scanning systems described hereinabove.

Figure 4D:
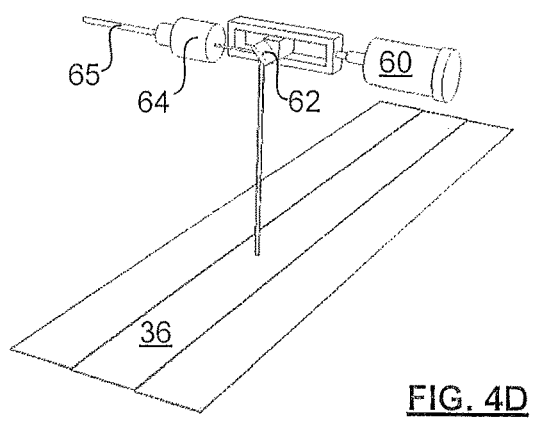

FIG. 4D is a schematic illustration of a fourth embodiment of a scanning system for an OCT probe 40. A linear displacement actuator with motor 60 provides a full sweep of the transverse direction.

Figure 4E:
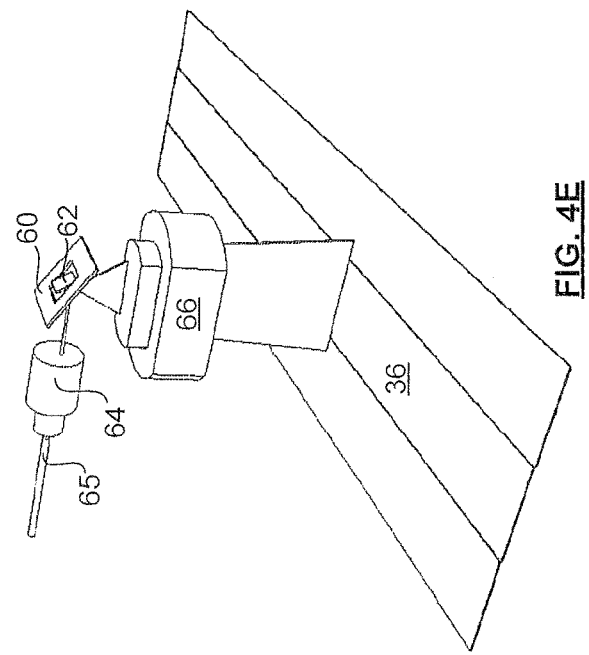

FIG. 4E is a schematic illustration of a fifth embodiment of a scanning system for an OCT probe 40. A micro-electro-mechanical system MEMS 60 drives a mirror 62 to provide an angular sweep to the beam, and a lens 66 (preferably F-theta or F-theta telecentric) provides a full sweep of the transverse direction.

Figure 5C:
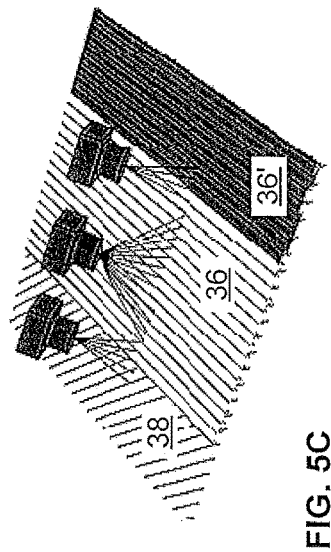
FIGS. 5A,B,C are schematic illustrations of scan patterns of single, double and triple OCT probe arrangements.
Figure 5B:
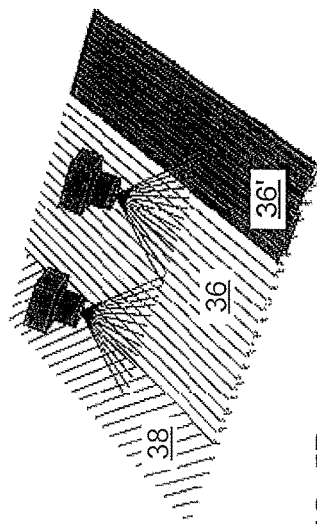
Figure 5A:
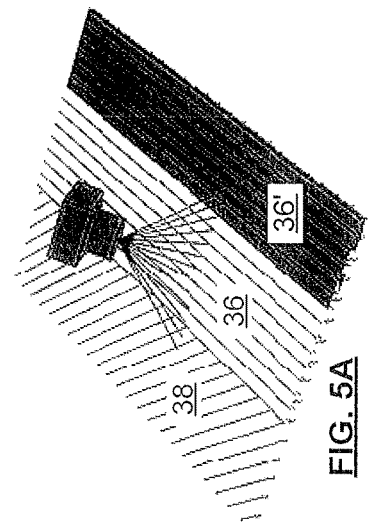

FIGS. 5A,B,C are three schematic illustrations of probe scan coverage schemes. In FIG. 5a a single probe scans a full width of a ribbon 36, and overlaps a small amount of an adjacent ribbon 36' that was previously deposited, and the part 38 below. In FIG. 5B two probes cover the ribbon 36, each also covering either an edge bordering an adjacent ribbon 36' that was previously deposited, or the part 38. In FIG. 5c three probes are used: two edge detectors and a centre of ribbon scan. The center of ribbon scan distributes measurements over a wider area, and therefore has a lower point density (assuming an equal rate of data capture). This allows a wider area to be measured with less accuracy (though sufficient to identify a protruding or loose ribbon lacking adherence to the part, a protruding ribbon that does not fill a radius of a concave region, a splice along a ribbon, a wrong location of a start or end of a ribbon, or a foreign object, an adhesive droplet, or debris at the surface of a minimum size), and still permits the edge detectors to provide high accuracy where it is needed for most accurate sensing of flaws relating to edges (gaps, overlaps, curl, twists, folds, etc.). A non-linear scan of a single probe can have exactly the same effect of distributing measurements according to sensitivity of the information.

Figure 6C:
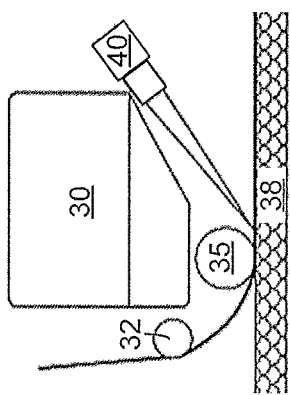
FIGS. 6A,B,C are schematic illustrations of mounting schemes for mounting an OCT probe to a generically represented robotic AFP head, respectively featuring a direct, near-field position, a reflected beam mounting, and a direct, far-field position.
Figure 6B:
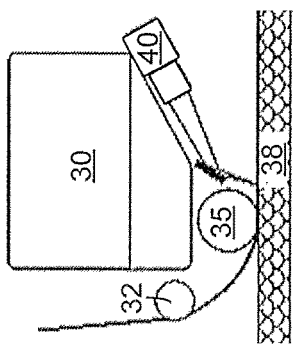
Figure 6A:
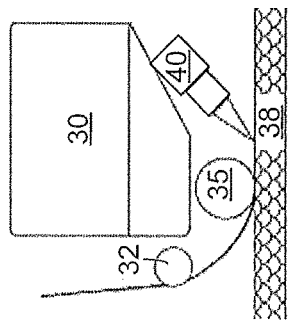

FIGS. 6A,B,C schematically illustrate three schemes for mounting the OCT probe 40 to a ARP head 30. The distance between the applicator 35 and the transverse illuminated line matters. The larger this distance, the greater a small change in angle of tilt of the ARP head 30 with respect to the applicator 30 will vary this distance, as well as the optical path length from the OCT probe 40 to the surface and back. Furthermore, the larger this distance, the greater a distance from a nominal center of the ribbon the beam will be when the ARP head 30 is steered to vary a yaw. Both of these can be precomputed from a planned trajectory of the layup, and pre-compensated for, to within limits of mobility of the scanning, and spot size/beam focus control. Furthermore, a distance between the start of deposition and start of scanning, a distance after deposition is stopped and when the scanning can stop, and a time lag between when a flaw is detected, and when a flaw was created, are all dependent on this distance. Accordingly, it is generally preferred to keep this distance small. On the other hand, a minimum distance behind an edge where the applicator 35 meets the surface is called for, to ensure that: a deflection of the applicator 35 does not result in occlusion of the transverse illuminated line; the positioning of the probe 40 does not extend the envelope of the ARP head 30; the angle of incidence remains within a preferred range of angles; or any rebound or elastic restoration of the part 38 after the roller has stabilized. Applicant has found that a distance of ⅓-3 times a radius (an effective radius of an applicator other than a roller), more preferably from 3/5-5/3 the radius, or more preferably half to twice the radius.

This generally allows for a wide variety mounting schemes that may depend on the specifics of the ARP head 30 used. Many ARP heads have small pockets of unoccupied space within its operating envelope that allow for an OCT probe 40 to be mounted with no penalty to the mobility of the ARP head, and no enlargement of the envelope. This means that the ARP machine can operate exactly as designed with or without the OCT probe 40. FIGS. 6A,B,C show three mounting schemes. In FIG. 6A, the OCT probe 40 is mounted as close to the applicator 35 as possible, at an angle of incidence of about 40°. In FIG. 6B, a mirror is used to reflect the beam to an angle of incidence of about 15°, providing closer to normal incidence, which may be preferred from a signal-to-noise perspective. It will be appreciate that a full spectrum of reflection, refraction, and diffraction schemes can be used to redirect the beam to a desired angle and position on the surface of the part 38. In FIG. 6C the OCT probe is mounted further from the part 38, removing the OCT probe 40 further from possible interaction with the part 38. It will be noted that the embodiment of FIG. 6C has the shortest distance separating the applicator 35 from the beam.

Figure 7:
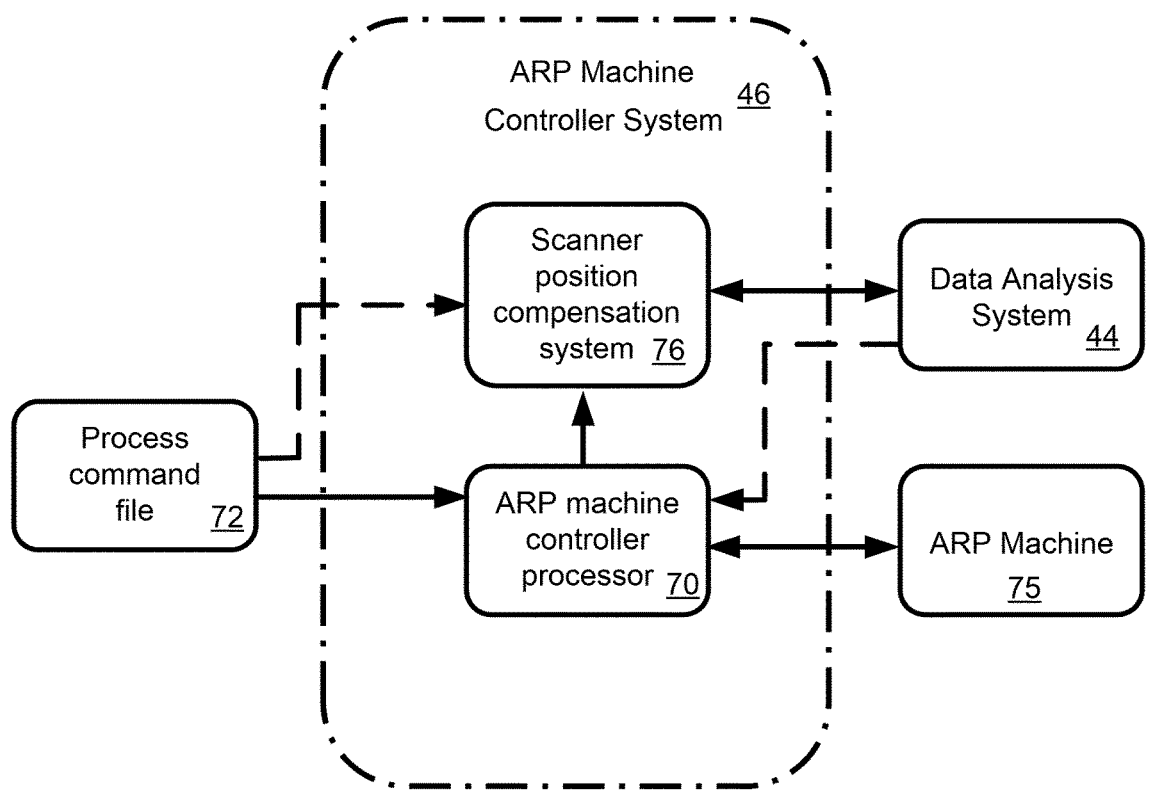
FIG. 7 is a schematic illustration of principal functional components of an ARP machine controller system equipped in accordance with the present invention.

FIG. 7 is a schematic illustration of an ARP machine controller system 46 featuring an ARP machine controller processor 70 adapted to receive a process command file 72, and execute it by commanding respective servos of the robot, and the ARP head 30 (collectively referred to as the ARP machine 75). The ARP machine controller processor 70 is in constant communications with the servos, actuators, and sensors of the ARP machine 75, and is able to indicate a position of each of the servos, at each instant. Accordingly, the ARP machine controller processor 70 receives and tracks position and orientation information from the robot, as well as pressure applied by the applicator, tension in the ribbon, etc.

In some embodiments of the invention, it is convenient for the data analysis system 44 to monitor the position of the robot continuously, so that profilometry information associated with each sweep of the ribbon can be accurately positioned in the tool space. A problem with doing so is compensating for a lag between a position of the applicator 35 at a given instant, and the position associated with the newly received OCT data. This compensation is performed by a scanner position compensation system 76, which is schematically illustrated as a separate functional block within the ARP machine controller system 46, but could be a separate process running on the ARP machine controller processor 70, or on the data analysis system 44. It will be appreciated that a separate robot controller may be a separately embodied processor, and the scanner position compensation system 76 may equally derive the position information from the robot controller.

The data analysis system 44 is shown optionally adapted to send the notice of a detected flaw to the ARP machine controller processor 70, for example: to interrupt the deposition; to identify a particular flaw that the ARP machine controller processor 70 is provisioned with program instructions to handle; or to indicate a remedial action to take given a detected flaw. There are numerous defects that can be detected, and various remedial actions can be taken. While some remedial action requires nothing more than logging (e.g. an identified splice that does not breach any exclusionary rule), and some require stopping the ARP head, backing it off, cutting and resuming from the cut location, others may be incorporated in a direct feedback for varying parameters of the deposition. For example, gaps and overlaps may be monitored closely enough that, within a limit, the steering and/or ribbon handling of the ARP machine controller processor 70 may be varied to ensure deposition is continuously within established parameters, using feedback loops well known in the art.

EXAMPLE

Figure 8:
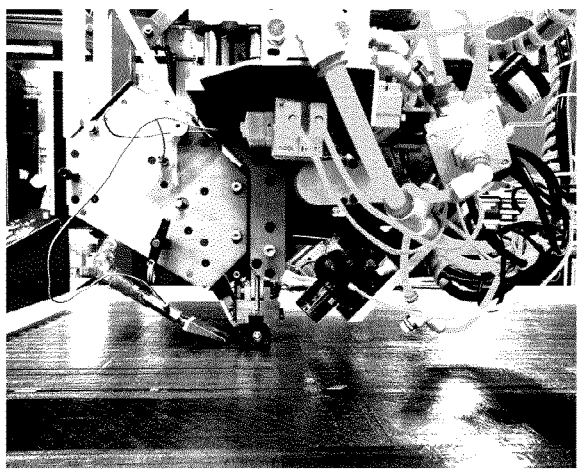
FIG. 8 is a photograph of a test system used in proof of concept experiments.

Applicant has tested an OCT system for use in profile characterization of a composite part formed of CFRP, is shown in FIG. 8. An optical scanner, as shown in FIG. 4A, but with a telecentric lens, was fixed to an AFP head (Automated Dynamics, model TPTSFPS-XP-FPS2.0-6AGMP-MVP). The transverse displacement of the focused optical beam on the surface was 23 mm, which corresponded to the $5/8^{th}$ inch ribbon that had been deposited with $5 1/8^{th}$ inch tows. The scanner was fixed to the AFP head, and the scanning pattern was a continuous constant reciprocating motion so the probe beam followed a zigzag pattern over the sample.

Point measurements were made at a rate of 30,000 measurements per second. The deposition speed was 50 mm/s and the line scan rate was 26 Hz since only every other line scan was kept. The spacing between the lines was 1.92 mm. Each line scan was composed of 586 measurements. The lateral distance between successive measurement points was 0.039 mm.

The distance between the outer surface of the lens and the surface of the band was 48 mm. The scan line is located 24 mm from the contact point between the compaction roller and the material, the compaction roller has a diameter of 27 mm. Measurement close to the compaction roller ensures complete monitoring of the part, including the control of stops at the end of each line, without the need for an extended extra motion of the deposition head. It also allows to measure complex parts with strong curvatures along the deposition path.

Since the optical scanner is located behind the AFP head, the optical measurement is performed from an angle of incidence of 45 degrees. This situation leads to a substantial challenge for optical monitoring, since only a small amount of light can be collected.

Figure 9:
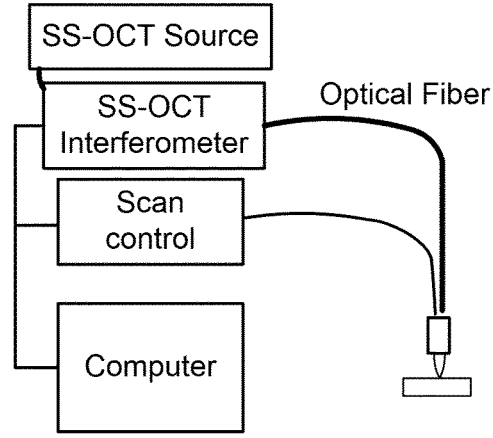
FIG. 9 is a schematic illustration of an OCT system used for the experiments.

The OCT system used for the demonstration is schematically illustrated in FIG. 9. The OCT system is a swept-source (SS-OCT) system. This technology was found to be sufficiently sensitive to address the challenge related to the low level of collected light. The SS-OCT system is composed of a swept-laser source (Santec HSL-2000-HS), an interferometer (Novacam Technologies), and a computer for data acquisition and data processing.

The light emitted by the swept-laser source is first sent to the interferometer and then to the optical scanner using optical fibers. As described above, the optical scanner is composed of a galvanometer and a lens, and was used to both illuminate and collect beams. Light collected by the scanner is sent back to the interferometer where it interferes with the light from an internal reference arm of the interferometer.

The swept-laser source sweeps wavelength in a band about 100 nm wide, in the vicinity of 1325 nm. The interferometer contains a Mach-Zehnder interferometer with balanced detection. As the wavelength is varied, the interference pattern evolves. The spatial position of the surface is obtained by performing a Fourier transform of the interference pattern. The precision of the measured position is of the order of 1 micrometer, much smaller than the height variation due to the surface of the tows. With the scanning process, this provides the height profile (a line-scan profile) across the tows.

Figure 10:
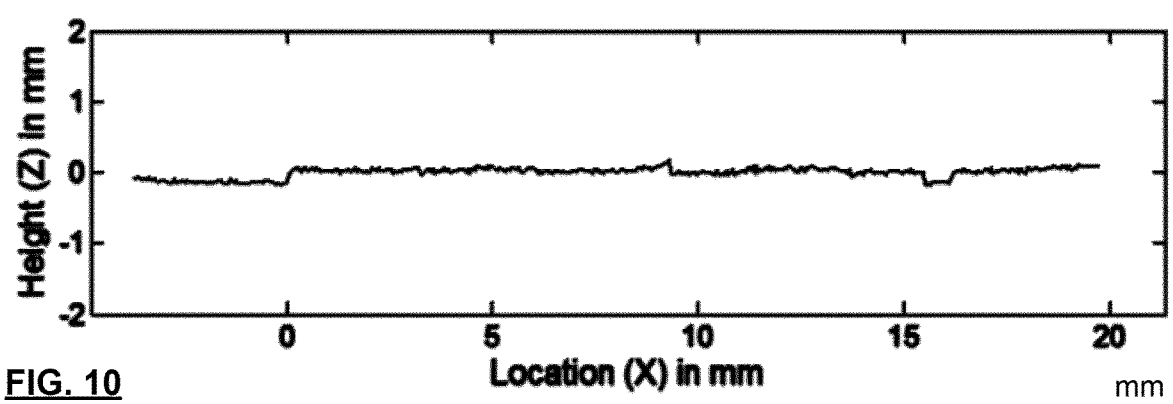
FIG. 10 is a plot of data showing a multi-tow profile image acquired during the experiments.

FIG. 10 shows a typical line scan profile across a band composed of 5 tows. This information provides clear signatures of defects that occurred during the deposition. Near the transverse position X=0 mm, the steep rise indicate the edge of the band that was just deposited. Near the transverse position X=9 mm, a short overlap is evident. At around X=15.5-16 mm, a gap is present between the deposited tows and the adjacent, previously deposited layers. These signatures are clear enough for defect identification to be performed by automated software. Please note the height or Z direction in the label refers to an elevation (i.e. a distance above a surface), with 0 referring to an expected height of the top of the band of ribbons.

Figure 11A:
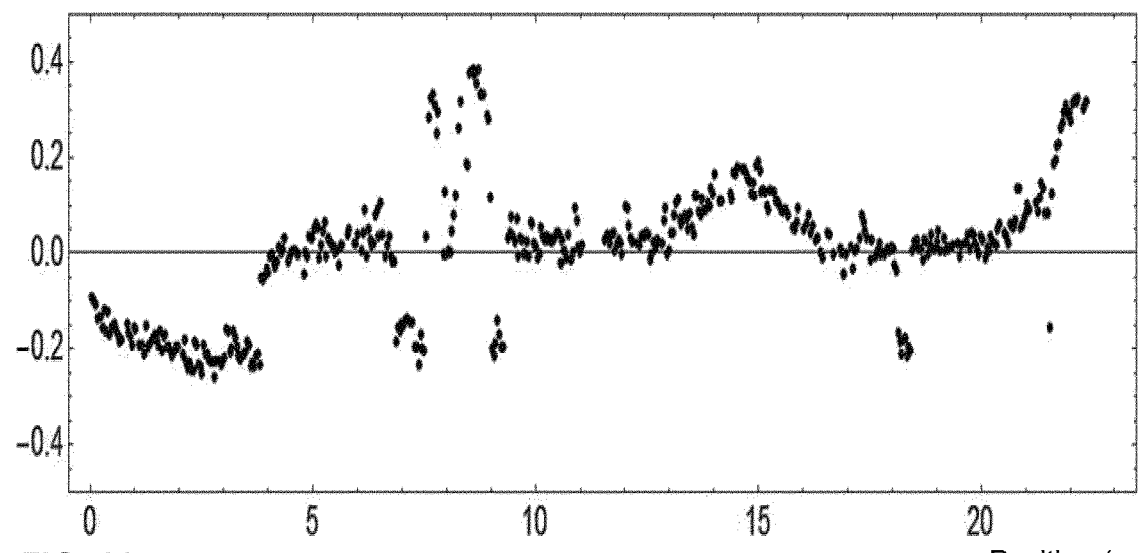
FIGS. 11a,b are a line scan, and a surface profile image acquired during the experiments showing a defect known as curling of a tow.
Figure 11B:
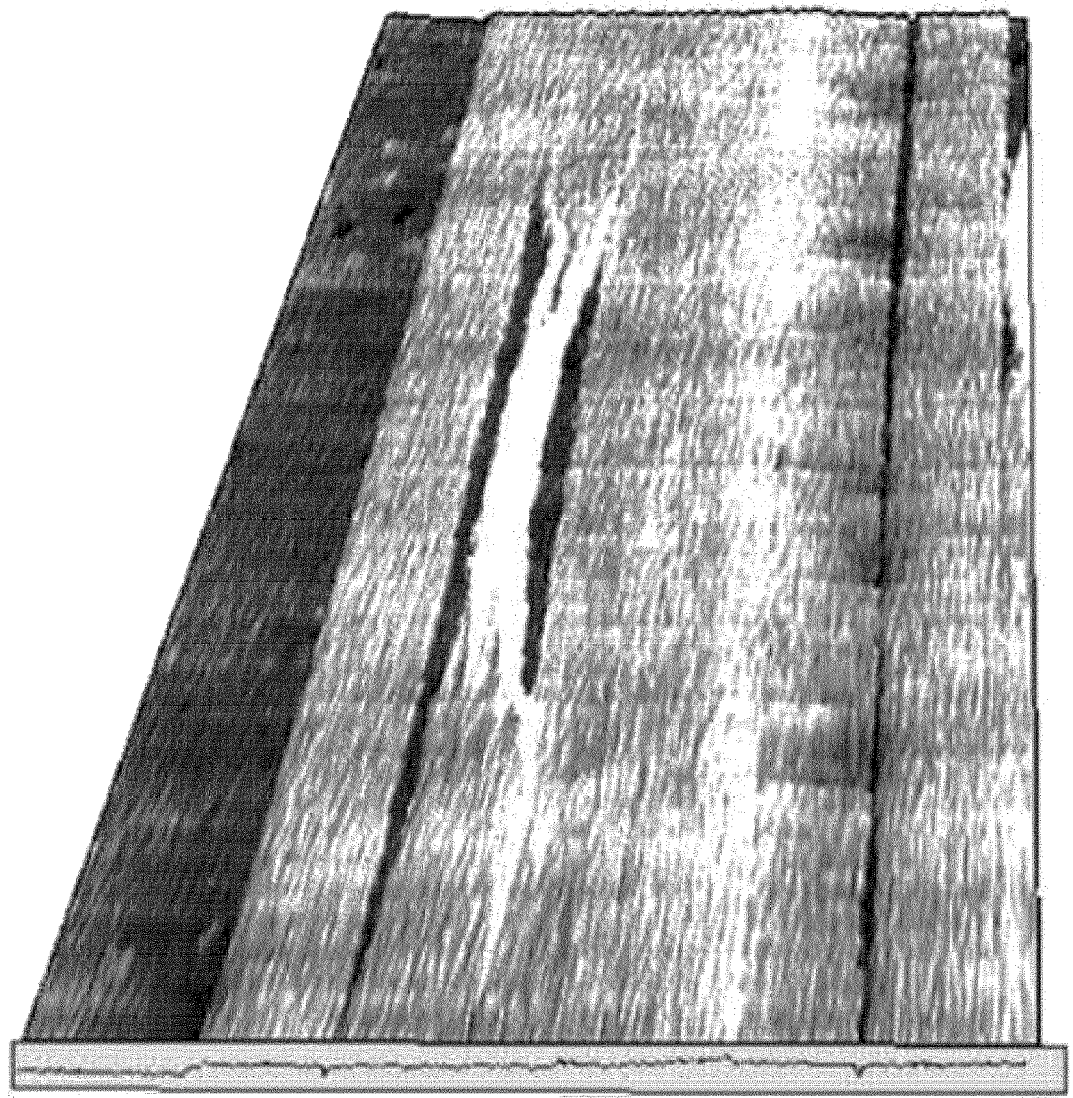
Figure 12A:
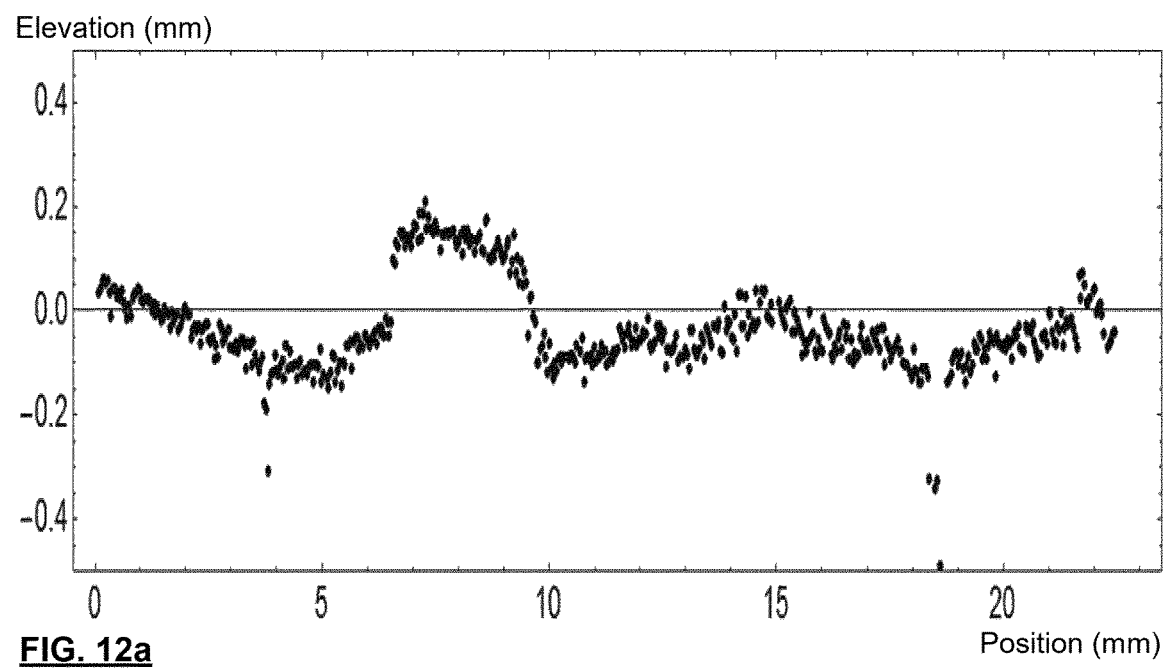
FIGS. 12a,b are a line scan, and a surface profile image acquired during the experiments showing a defect known as a tow splice.
Figure 12B:
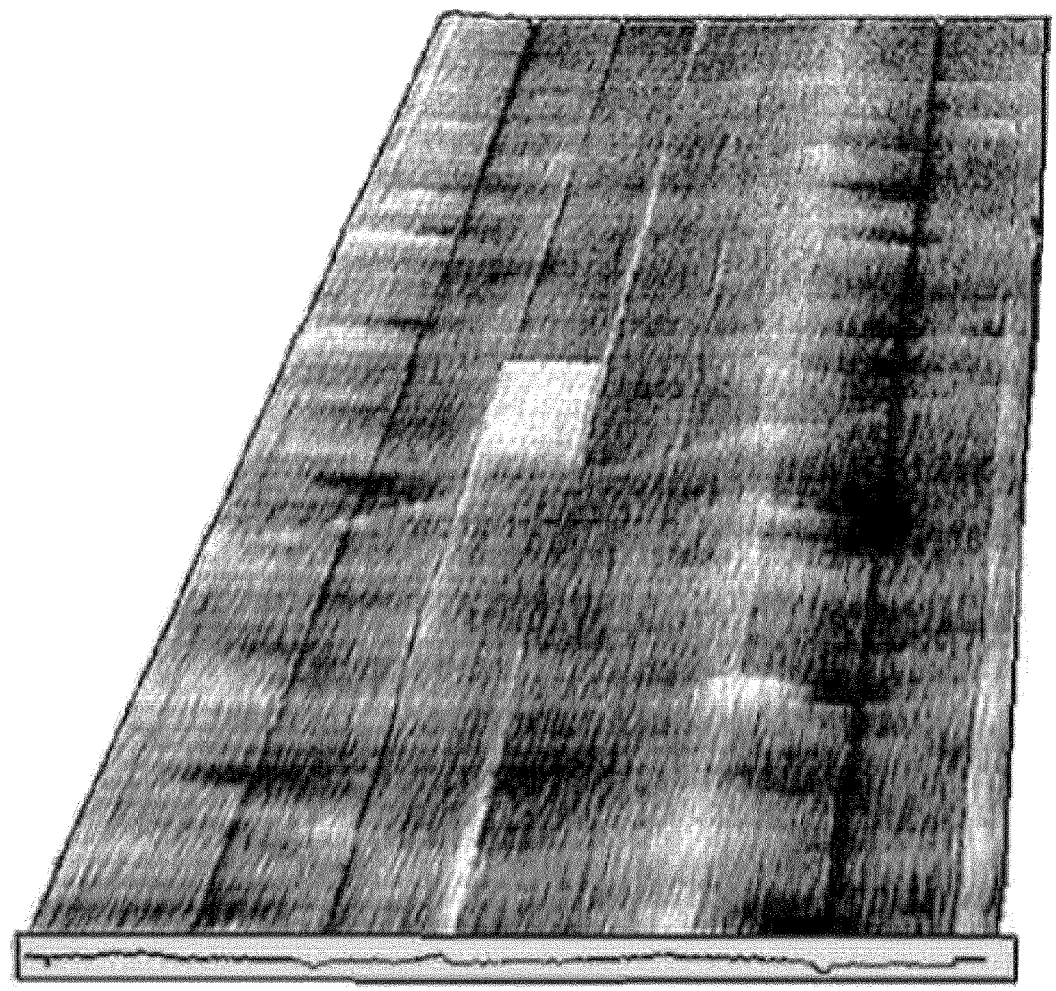
Figure 13A:
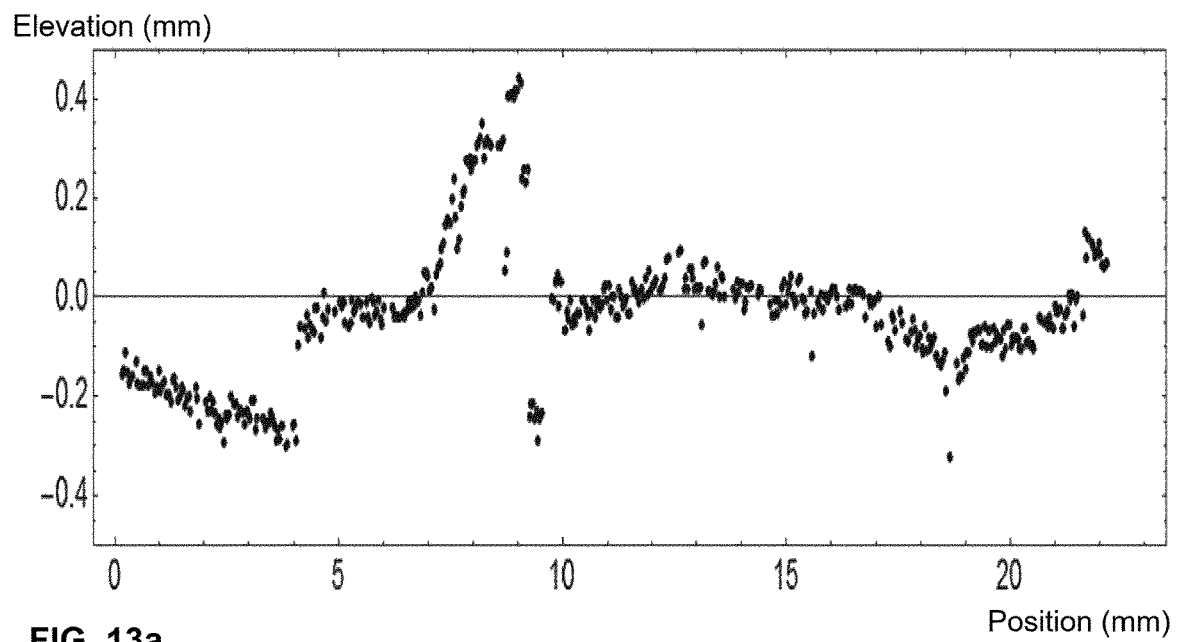
FIGS. 13a,b are a line scan, and a surface profile image acquired during the experiments showing a defect known as tow twist.
Figure 13B:
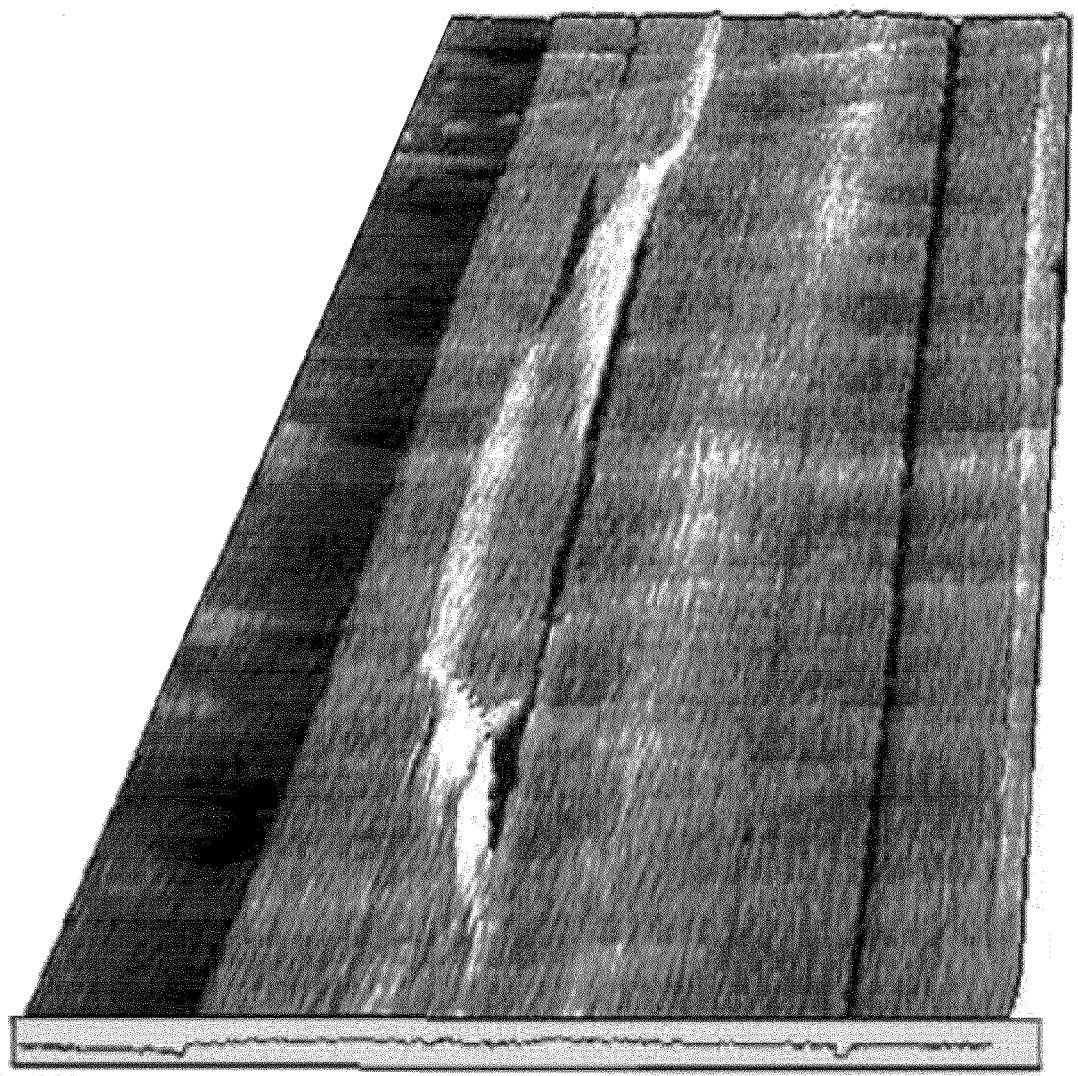

FIGS. 11*a,b*, 12*a,b*, and 13*a,b* are a representative set of defects that have been observed using the system. In each case, a raw data line scan, and a surface profile map are provided. The surface profile maps have been modified with contrast, gamma, and brightness to improve visibility in a black and white picture. FIGS. 11*a,b* show curling of the edges of one tow. FIGS. 12*a,b* show where a tow splice is located. Tow splice information is recognized to be an important feature affecting quality of parts, and advantageously an arrangement of splices in the composite part can be mapped out, to apply exclusionary rules that preclude concentrations of the splices in particular locations. Identification of a splice in an undesired location may be handled by replacing the ribbon, and resuming deposition. FIGS. 13*a,b* show where a tow is twisted.

Accordingly, Applicant has demonstrated that OCT profilometry provides sufficient information for characterizing ribbon placement on an automated ribbon placement machine. Applicant has demonstrated this on a commercially available AFP head with 5 tow deposition, in real-time, without slowing down the deposition.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. An automated process for online monitoring of Automated Ribbon Placement ARP, the process comprising:
   feeding a ribbon while providing robotic control to move an applicator against a previously deposited layer composed of one or more ribbons, to press the ribbon against the layer to build up a fibre reinforced composite;
   scanning a beam of light across a surface of the ribbon at a first location of the ribbon after the pressing, while the same ribbon is being pressed on the layer at a second location, the beam illuminating a spot on the surface;
   collecting light scattered from the spot to obtain a sample beam;
   directing the sample beam and a reference beam onto a photodetector, to obtain an electrical interference signal;
   receiving a plurality of the electrical interference signals that characterizes a topography of the deposited ribbon on the surface; and
   processing the plurality of the electrical interference signals to identify whether a deviation from a planned lay-up of the ribbon is manifest.

2. The process according to claim 1 wherein collecting the scattered light comprises collecting back-reflected light from the first location.

3. The process according to claim 2 wherein scanning the beam and collecting the light are jointly performed by an optical device mounted to a robotic head that includes the applicator.

4. The process according to claim 3 wherein the optical device is statically mounted to the robotic head, whereby the first and second locations have constant separation except for a bounded variation caused by a tilting of the robotic head, and the optical device is centered on the ribbon except for a bounded variation caused by a steering of the ribbon.

5. The process according to claim 3 wherein scanning further comprises line scanning the spatial illumination pattern in a direction that is generally transverse to the ribbon, whereby, in each cycle of the line scan, the spatial illumination pattern illuminates at least part of a width the ribbon including at least one edge thereof.

6. The process of according to claim 5 wherein the optical device couples light to at least one optical fibre.

7. The process according to claim 5 wherein during the line scanning a distance between where the applicator meets the surface and the spot is maintained between ⅓ and 3 times a radius of the applicator.

8. The process according to claim 3 wherein the electrical interference signal includes tomographic and topographic information that collectively characterize the topography of the surface and the ribbon.

9. The process according to claim 5 wherein the ribbon is composed of high absorption, carbon-fibres.

10. The process according to claim 3 further comprising generating the beam of light and reference beam from a white light source, a swept wavelength source, a laser, or a diode, where receiving the plurality of electrical interference signals comprises applying signal processing according to an associated interferometric technique.

11. The process according to claim 3 where processing the plurality of signals is based on the processing of a single scan, a combination of successive scans, or a combination of scans on adjacent regions.

12. A kit for adapting an Automated Ribbon Placement ARP head for online monitoring, the kit comprising:
an interferometric topographic sensor adapted to generate an interferometric signal;
instructions or mounting supplies for mounting the sensor to the AFP head at a position and orientation to record a topography of a surface of a ribbon after deposition; and
program instructions that, run on a processor enables to processor to:
process the interferometric signal in real-time to obtain topographical information characterizing the ribbon after deposition; and
use the topographical information to determine whether a planned lay-up is being executed flawlessly, or whether a defect is present.

13. The kit as claimed in claim 12 further comprising the ARP head, which comprises:
at least a part of a ribbon supply for feeding a ribbon composed of a carbon fiber reinforced polymer (CFRP);
a ribbon cutter for cutting the ribbon fed through the part of the ribbon supply; and
an applicator for pressing the fed ribbon against a tooling to build up a CFRP composite part, under a control and guidance of the robot.

14. The kit as claimed in claim 12 wherein the interferometric topographic sensor is an OCT sensor with a sampling rate above 50 KHz, with a scanner for moving a spot of illumination on the surface in a direction that is generally transverse to the ribbon after deposition, the scanner having a speed of at least 1 cm per second.

15. The kit as claimed in claim 12 wherein the sensor comprises: a beam source, focusing and collecting optics, and a photodetector; wherein an angle of incidence of the beam on the surface, the focusing and collecting optics, a power of the beam source, and a sensitivity of the photodetector are chosen so that the interferometric signal generated provides tomographic and topographic information that collectively characterize the topography of the surface for a ribbon composed of high absorption, carbon-fibres.

16. The kit as claimed in claim 12 wherein the instructions or mounting supplies for mounting to the AFP head places the sensor entirely within a previously established envelop of the AFP head.

17. The kit as claimed in claim 12 wherein the interferometric topographic sensor is a Swept Source OCT sensor.

18. The kit as claimed in claim 13 wherein the kit is assembled and mounted to a robot.

19. The kit as claimed in claim 13 wherein the interferometric topographic sensor is an OCT sensor with a sampling rate above 50 KHz, with a scanner for moving a spot of illumination on the surface in a direction that is generally transverse to the ribbon after deposition, the scanner having a speed of at least 1 cm per second.

20. The kit as claimed in claim 19 wherein the sensor comprises: a beam source, focusing and collecting optics, and a photodetector; wherein an angle of incidence of the beam on the surface, the focusing and collecting optics, a power of the beam source, and a sensitivity of the photodetector are chosen so that the interferometric signal generated provides.

* * * * *